United States Patent
Dods et al.

(10) Patent No.: US 7,195,429 B2
(45) Date of Patent: Mar. 27, 2007

(54) DRILL TEMPLATE WITH INTEGRAL VACUUM ATTACH

(75) Inventors: Bryan G. Dods, Ballwin, MO (US); John Macke, St. Charles, MO (US); James Morrison, O'Fallon, MO (US); Robert W. Scott, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 528 days.

(21) Appl. No.: 10/690,367

(22) Filed: Oct. 20, 2003

(65) Prior Publication Data

US 2005/0084344 A1    Apr. 21, 2005

(51) Int. Cl.
    *B23B 47/28* (2006.01)
(52) U.S. Cl. .................... 408/67; 408/115 R
(58) Field of Classification Search .......... 408/1 R, 408/67, 79, 97, 95, 88, 115 R
    See application file for complete search history.

(56) References Cited

U.S. PATENT DOCUMENTS

| 2,367,582 | A | * | 1/1945 | Honyoust ............... 408/76 |
| 2,417,539 | A | * | 3/1947 | Aronson ............... 408/72 R |
| 3,158,045 | A | * | 11/1964 | Siler ................... 408/1 R |
| 4,108,566 | A | * | 8/1978 | Jones ................. 408/115 R |
| 4,294,567 | A | * | 10/1981 | Wiggins ............... 408/72 R |
| 4,474,514 | A | * | 10/1984 | Jensen ................ 408/115 R |
| 4,952,101 | A | * | 8/1990 | Coombs ............... 408/115 R |
| 5,131,793 | A | * | 7/1992 | Luebbert ................. 408/101 |
| 5,569,001 | A | * | 10/1996 | Brutscher et al. ...... 408/115 R |
| 6,851,898 | B2 | * | 2/2005 | Ege et al. ................ 408/67 |
| 6,887,146 | B2 | * | 5/2005 | Staas et al. ............... 454/66 |
| 2003/0170082 | A1 | * | 9/2003 | Garcia et al. ............ 408/1 R |
| 2004/0076484 | A1 | * | 4/2004 | Alam et al. ............... 408/79 |

* cited by examiner

*Primary Examiner*—Daniel W. Howell
(74) *Attorney, Agent, or Firm*—Ingrassia Fisher & Lorenz, P.C.

(57) ABSTRACT

A drill template includes a vacuum housing with a skirt having a CAD-formed contact surface formed to an exact fit with a mold line surface of a structure. The drill template includes at least one drill guide bushing extending through the vacuum housing from a top surface to an interior surface of the vacuum housing; a vacuum port integral to the vacuum housing; and at least one index hole for positioning and aligning the vacuum housing on the structure. Index holes extend from the top surface through to the CAD-formed contact surface of the vacuum housing. A CAD-formed edge of part locator is formed according to a CAD solid model of the aircraft fuselage and fits to a precise location of the structure for precisely positioning the template on the structure. A vacuum port provides vacuum to the interior of the vacuum housing for removing drilling debris and dust.

19 Claims, 8 Drawing Sheets

DRILL TEMPLATE WITH INTEGRAL VACUUM ATTACH

BACKGROUND OF THE INVENTION

The present invention generally relates to manufacture and assembly of structures using composite materials and, more particularly, to drilling holes at precise locations in a part—such as a composite or metallic aircraft part—and, for safety and health reasons, collecting the debris—such as composite dust or metallic drill chips—generated by the drilling process.

In conventional practice, before a pattern of holes is drilled in a part to be assembled into a structure, a template, or jig, is made and placed on the surface of the part to be drilled. For example, in the aerospace industry, the structure, or assembly, may be a composite aircraft skin over an aluminum substructure. Examples may also be found in the marine and refrigeration industries, such as applications to boat hulls and heating/air conditioning ducts. The template or jig contains holes conforming to the desired hole pattern that is to be made on the surface of the part to be drilled. A drill is then inserted, typically manually by a drill operator, in each hole of the jig and is used to drill a hole into or through the part.

Drill operators in one manufacturing environment have experienced a high rate of ergonomic injuries—such as carpal tunnel syndrome—some of which occur, for example, due to the number of manually drilled holes and the drilling equipment used. Due to the nature of the structure and the capabilities of the tools used, the manual drilling operation for a structure of composite skins over aluminum substructure typically consists of at least four drilling passes, increasing operator exposure to injury with each additional pass. In addition, the drilling process generates particles of material, such as metal and composite debris, from the structure. For example, aircraft skin often includes composite materials—such as carbon and epoxy—which release a dust of fine particles when drilled through. The fine particles are unhealthy when absorbed in the human body. Also, the dust of fine particles may contaminate sensitive equipment and cause reliability problems. For health and safety reasons, operators are required to collect the carbon epoxy dust with a vacuum collection system during the drilling process. Prior art templates generally include a flat plate with a separate vacuum system where the operator or operators must position the template and operate a drill separately from the vacuum system. The separate operation of these systems is generally inefficient for collection of dust particles generated during the drilling process, and the separate operation of these systems further increases operator exposure to a high rate of ergonomic injuries when manually drilling a large number of holes.

For example, the prior art used strip templates that are typically flimsy 0.020–0.030 inch metal strips curved to more or less conform to the surface of the structure to be drilled. Thus, the prior art templates are not made to fit exactly to the mold line surface of the structure, and are generally copied from a master tool, rather than directly from the mold line specifications. The lack of exact of fit to the mold line generally limits the positioning and drilling accuracy of the template. Drill guide bushings, of hardened metal highly resistant to wear, may be used to line the holes of the template and to direct and guide the drill as it passes through the template and into the assembly. The use of drill guide bushings is improved with a thicker jig to grip and hold the bushing without movement throughout the drilling operation and to correctly direct the drill as it passes through the jig and into the structure.

A thicker, more rigid jig or template could also improve clamp-up of the structure. Clamp-up refers to the temporary clamping together, for example, of the skin and aluminum substructure together with the template. Clamp up is commonly achieved in the aerospace industry using pin clamps inserted through a hole that is lined up in the template, skin, and substructure, which grip the template, skin, and substructure and hold them together in the region near the hole during the drilling process. By allowing less relative movement among the template, skin, and substructure, a thicker or more rigid template could improve the stability of the clamp up and thereby improve hole quality. Improved hole quality could, for example, eliminate deburring of the structure after drilling, which typically requires disassembly of the skin and substructure of the structure, so that disassembly of the structure and deburring the structure after drilling could both be eliminated.

As can be seen, there is a need for a template for drilling a pattern of holes in a structure and for collecting debris generated by the drilling process. There is also a need for a drill template with an integral vacuum collection system. Moreover, there is a need for a drill template that has an exact fit to a mold line surface of a structure, that increases positioning and drilling accuracy and reduces the number of passes required to drill a structure. Furthermore, there is a need for a template that also improves the clamp-up of the structure and, thus, improves hole quality and eliminates deburring.

SUMMARY OF THE INVENTION

In one aspect of the present invention, a drill template includes a vacuum housing having a CAD-formed contact surface; and at least one drill bushing extending through the vacuum housing from a top surface to an interior surface of the vacuum housing.

In another aspect of the present invention, a drill template is disclosed for drilling holes into a structure. The drill template includes a vacuum housing having a CAD-formed contact surface. The vacuum housing is formed by selective laser sintering, includes at least one drill guide bushing extending through the vacuum housing from a top surface to an interior surface of the vacuum housing, and includes at least one vacuum port integral to the vacuum housing.

In still another aspect of the present invention, a debris collecting vacuum drill template for forming holes in a structure is disclosed. The drill template includes a vacuum housing having a CAD-formed contact surface; at least one drill bushing extending through the vacuum housing from a top surface to an interior surface of the vacuum housing; and at least one drill support attachment positioned near a drill bushing. The drill support attachment is adapted to secure a drill to the drill template. The vacuum housing includes an integral vacuum port that provides vacuum communication from an opening to the interior surface of the vacuum housing.

In yet another aspect of the present invention, a drilling system for an aircraft fuselage structure is disclosed. The system includes a drill template. The drill template includes a vacuum housing with a skirt having a CAD-formed contact surface formed to an exact fit with a surface of the aircraft fuselage structure. The drill template includes at least one drill guide bushing extending through the vacuum housing from a top surface to an interior surface of the vacuum housing; at least one vacuum port integral to the vacuum housing; at least one index hole for positioning and aligning the vacuum housing on the aircraft fuselage structure, the index hole extending from the top surface through to the CAD-formed contact surface of the vacuum housing; a CAD-formed edge of part locator formed according to a CAD solid model of the aircraft fuselage structure and fitting to a precise location of the aircraft fuselage structure; and a vacuum port that provides vacuum communication from an external opening to the interior surface.

In a further aspect of the present invention, a method is disclosed of forming a pattern of holes in a structure comprising a CAD-built skin and substructure. The method includes steps of: (1) positioning a drill template on a surface of the structure using a CAD-formed edge of part locator of the drill template, the CAD-formed edge of part locator being formed according to a CAD solid model of the structure; (2) contacting the structure with an exact fit between a CAD-formed contact surface of the drill template and a CAD-built mold line surface of the structure; (3) connecting a vacuum system to an integral vacuum port of the drill template; and (4) drilling at least one hole into the structure guided by a drill bushing of the drill template.

These and other features, aspects, and advantages of the present invention will become better understood with reference to the following drawings, description, and claims.

DETAILED DESCRIPTION OF THE INVENTION

Figure 1:
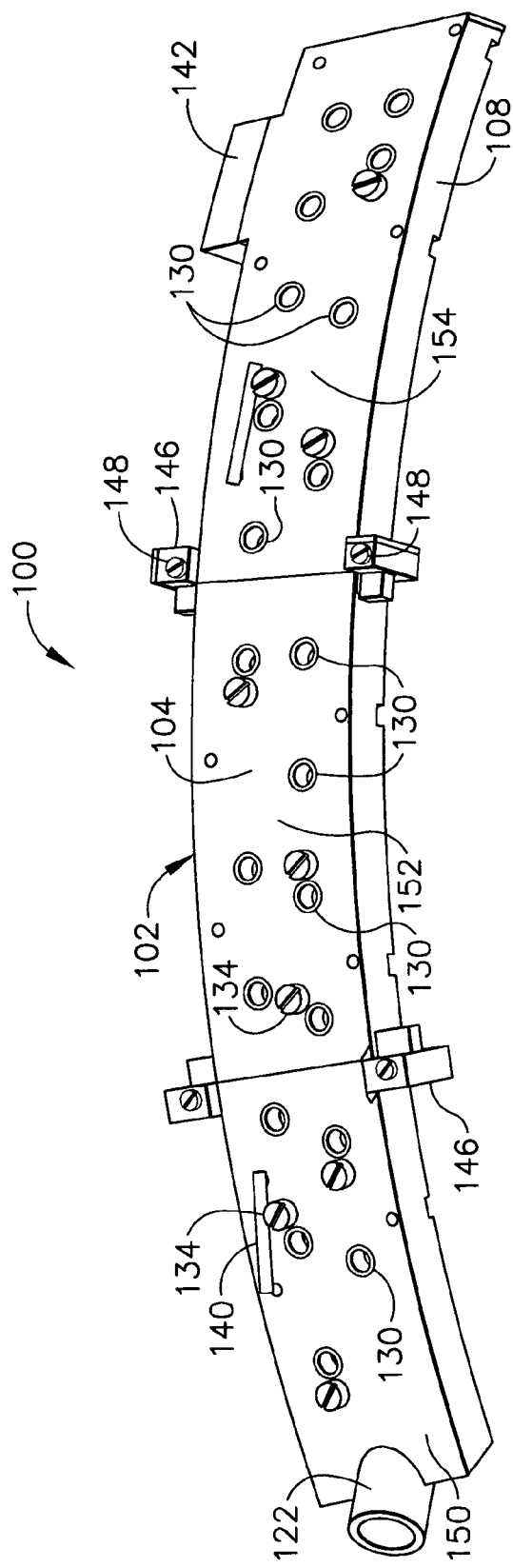
FIG. 1 is a top view of a drill template in accordance with an embodiment of the present invention.

The following detailed description is of the best currently contemplated mode of carrying out the invention. The description is not to be taken in a limiting sense, but is made merely for the purpose of illustrating the general principles of the invention, since the scope of the invention is best defined by the appended claims.

Broadly, one embodiment of the present invention provides a template for drilling a pattern of holes in a structure and for collecting debris generated by the drilling process. The structure may be part of a product manufactured in the aerospace, marine, or refrigeration industries as typified by, for example, a skin portion attached to a frame substructure. Drill templates are generally useful in such situations for drilling holes in precise locations through the skin and into or through a portion of the frame, for example, for attaching the skin to the frame with fasteners received by the holes. The skin or structure may have a precisely defined exterior surface, referred to as an outer mold surface, mold line surface, or outer mold line (OML). In one embodiment, a drill template includes a novel contact surface formed according to the precise definition of the mold line surface, and conforming to the mold line surface so that an exact fit is achieved between the mold line surface and the contact surface of the drill template, in contrast to prior art drill templates. For example, the drill template of one embodiment may be built directly from computer aided design (CAD) engineering solid models using selective laser sintering (SLS). Although SLS is used as an example throughout to illustrate a type of fabrication process that is compatible with CAD techniques for fabricating a drill template according to an embodiment of the present invention, other types of processes could be used as well. For example, fused deposition modeling (FDM) and stereo-lithography (SLA) fabrication processes also could be used. These and other processes vary only by the method that they fabricate the parts and the materials that they use. They all generate the parts directly from a CAD model. The CAD-built drill templates may fit exactly to the mold line surface, because they are made using the CAD geometry, i.e., the CAD electronic data files, used to specify and form the mold line surface. The exact fit so achieved may improve the accuracy and stability of the positioning of the template and may allow the template to be formed as a more solid or rigid template than the typical flat, prior art templates so that the drill holes are located more accurately and drilled more precisely. The enhanced accuracy and precision of drilling may reduce the drilling operation from a 4–5 step drilling operation to a single drilling step. In addition, a more solid or rigid drill template may allow a novel drill support attachment to be incorporated into the drill template, allowing specialized drills to be attached to and used with the novel drill template, which could not be used with prior art templates. Another advantage of building the templates directly from CAD solid models, compared to the prior art practice of building templates from a master tool, is that master tools do not need to be kept, eliminating problems, for example, attendant on storing, cataloging, and possible damage to master tools.

In addition, the selective laser sintering process may enable the tool designer, manufacturing engineering, and operator to incorporate unique details into a tool. In one embodiment, a drill template may incorporate a novel integral vacuum collection system including a vacuum attach, i.e., a port for attaching a vacuum source to the drill template, and vacuum housing for removing and collecting particles—such as drill chips, carbon-epoxy dust, and debris generated during the drilling process—which may be hazardous and may be required to be removed and collected, for example, for health and safety purposes. Also, for example, removing and collecting debris particles—such as metallic drill chips—may simply provide a benefit of eliminating or reducing cleanup. Prior art drill templates generally include a flat plate with a separate vacuum system where the operator or operators must position the template and operate the vacuum system separately from the drill. The separate, manual operation of these systems contributes to a high rate of ergonomic injuries when drilling a large number of holes.

Moreover, the separate operation of these systems is usually inefficient for collecting debris generated during the drilling process. In one embodiment, the drill template with integrated vacuum system may reduce the rate of ergonomic injuries and improve the efficiency of debris collection.

Referring now to FIGS. 1 through 6, in which like items are referenced with the same numeral throughout, a drill template 100 with integral vacuum attach is illustrated in accordance with an embodiment of the present invention. Drill template 100 may include a vacuum housing 102 having a top surface 104 and an interior surface 106. Vacuum housing 102 may include side skirts 108 and 110, and end skirts 112 and 114. Each of skirts 108, 110, 112, and 114 may have a contact surface 116. For example, skirt 108 may have contact surface 109, skirt 110 may have contact surface 111, skirt 112 may have contact surface 113, and skirt 114 may have contact surface 115, so that contact surfaces 109, 111, 113, and 115 collectively form contact surface 116 of housing 102. Contact surface 116 may be formed using CAD techniques to conform to the CAD engineering solid model of the outside mold line surface of a structure, such as outside mold line surface 118 of structure 120 shown in FIGS. 4, 5, and 6, which, for example, may be part of an aircraft fuselage.

Vacuum housing 102 may be fabricated, for example, from nylon using a selective laser sintering process in conjunction with CAD techniques to achieve an exact fit, i.e., being formed using the same CAD solid model as is used to form structure 120, of contact surface 116 with the structure 120. As described above, the exact fit of contact surface 116 of vacuum housing 102 to the mold line surface 118 of structure 120 may enhance the positioning and drilling accuracy of drill template 100. Moreover, the exact fit of drill template 100 to structure 120 may improve the efficiency of debris and dust collection by forming a vacuum chamber in an interior space formed between exterior mold line surface 118 of structure 120 and interior surface 106 of vacuum housing 102, the interior space of the vacuum chamber being surrounded and enclosed by skirts 108, 110, 112, and 114 and closed by contact of contact surfaces 109, 111, 113, and 115 with mold line surface 118.

Vacuum housing 102 may include an integral vacuum attach, or vacuum port 122. Vacuum port 122 may include an external, round opening 124, seen in FIG. 3, that may communicate through skirt 114 to an opening 126, seen in FIG. 2, at the interior surface 106 of vacuum housing 102 to provide vacuum from an external vacuum system through opening 124 to opening 126. Vacuum port 122 may be attached to a vacuum hose of a vacuum system via hose fitting 128, seen in FIGS. 5 and 6, so that vacuum may be applied through the hose to the interior vacuum chamber, described above, between structure 120 and drill template 100, for removing and collecting drilling debris concurrently with the drilling operation, as shown in FIG. 6.

Vacuum housing 102 may include drill bushings 130, which may be formed to pass through vacuum housing 102 from top surface 104 to interior surface 106. Drill bushings 130 may be formed so that a drill bit—such as drill bit 132 shown in FIG. 6—may be inserted into drill bushing 130 and guided by drill bushing 130 to form a hole in structure 120. Vacuum housing 102 may also include one or more drill support attachments 134. A drill support attachment 134 may be positioned near a drill bushing 130. A drill support attachment 134 may be locked onto a drill—such as drill 136 shown in FIG. 6—to help control the placement of the drill bit—such as drill bit 132—into one or more of drill bushings 130.

Figure 2:
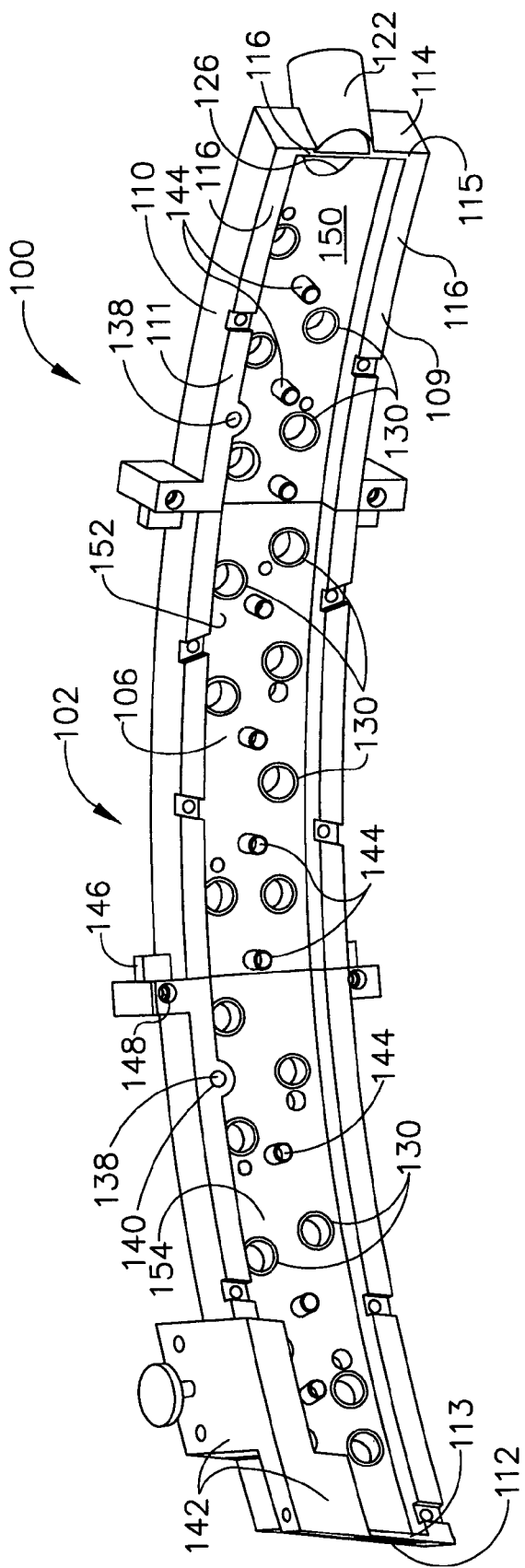
FIG. 2 is a bottom view of the drill template illustrated in FIG. 1.
Figure 3:
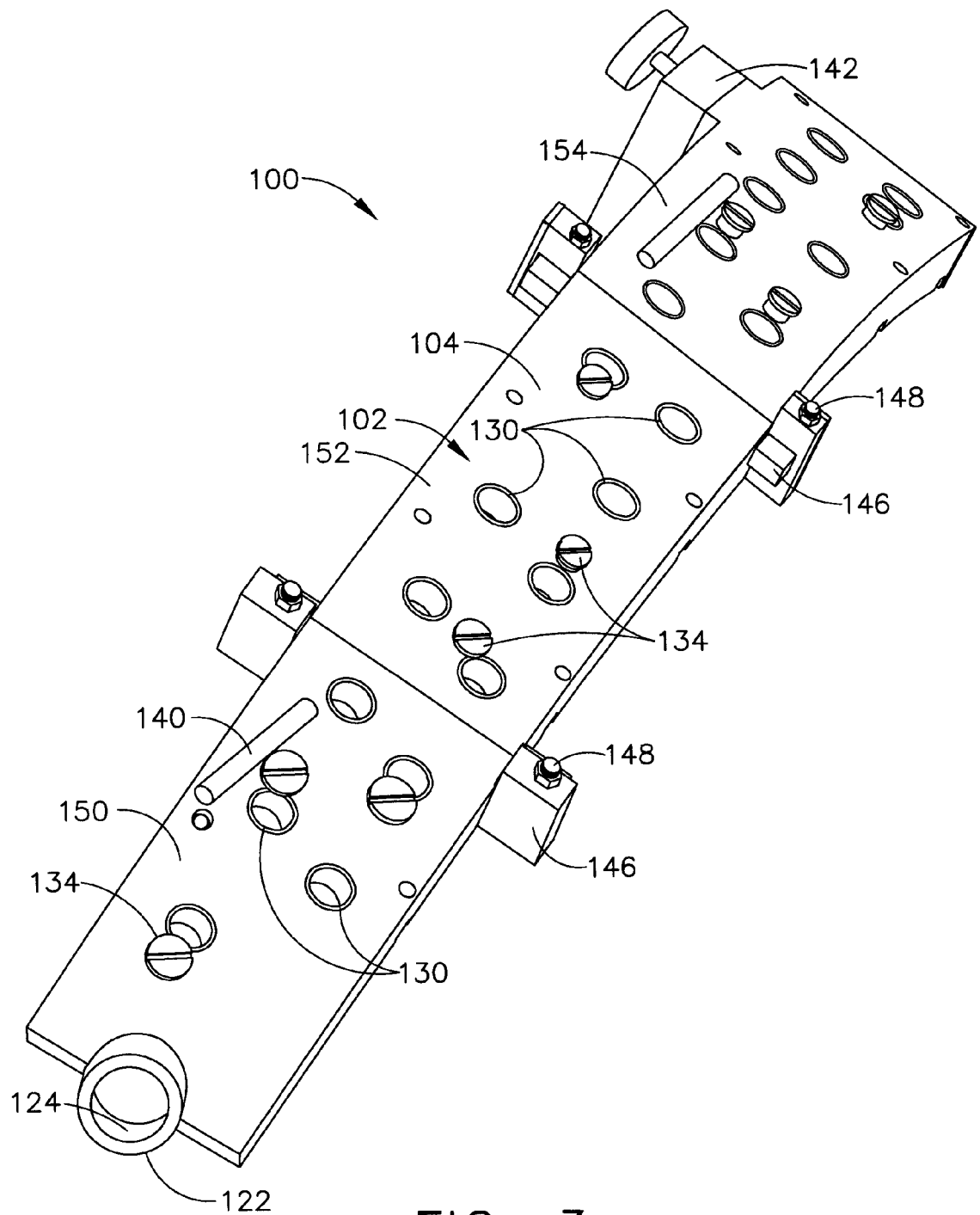
FIG. 3 is an oblique view of the drill template illustrated in FIG. 1.

Vacuum housing 102 may include index holes 138 which may extend from top surface 104 to contact surface 116, as shown in FIG. 2. Index holes 138 may be formed to receive an alignment pin 140, as shown in FIGS. 1, 2, and 3. Alignment pins 140 may be temporarily inserted into an index hole drilled in structure 120, including a skin portion of structure 120 or a substructure portion of structure 120. Alignment pins 140 may inserted into index holes 138 to help position and align template 100 so that the holes located by drill bushings 130 may be formed in the desired positions.

Vacuum housing 102 also may include one or more edge of part locators 142. Edge of part locator 142 may be formed, for example, as shown in FIGS. 1 through 3, so that it may fit against an edge of structure 120 at a precise location so that drill template 100 may be located precisely at a pre-defined location relative to structure 120, further helping to position and align template 100 so that the holes located by drill bushings 130 may be formed in the desired positions. Edge of part locator 142 may be formed using CAD techniques to form edge of part locator 142 using the CAD engineering solid model of structure 120 so that edge of part locator 142, and thus vacuum housing 102, fits to a precise location relative to structure 120. Vacuum housing 102 may be fabricated, for example, from nylon using a selective laser sintering process in conjunction with CAD techniques to achieve an exact fit, i.e., being formed using the same CAD solid model as is used to form structure 120, of edge of part locator 142 with the structure 120. The exact fit of edge of part locator 142 to a precise location of structure 120 may enhance the positioning and drilling accuracy of drill template 100.

Vacuum housing 102 may include standoff buttons 144. Standoff buttons 144 may be formed on interior surface 106 of vacuum housing 102, as shown in FIG. 2. Standoff buttons 144 may be used to hold structure 120 steadily in place when a hole is drilled in structure 120 guided by one of the drill bushings 130. For example, an aircraft skin included in structure 120 may be flexible and may bend when a hole is drilled into it. A standoff button 144, however, may hold the aircraft skin so that when the hole is drilled in the skin, the skin may not push back against the drill and change the shape of the drilled hole. Generally, holes drilled in aircraft structures are required to meet tight tolerances in shape and dimension and it may be undesirable to have the hole move during the drilling process.

Due to current size limitations with the selective laser sintering process, vacuum housing 102 may be formed in one or more sections. For example, some selective laser sintering systems may form molded parts with a maximum dimension in a range from 10 inches to 15 inches. Thus, as shown in FIGS. 1 through 3, vacuum housing 102 of template 100 may be formed from three sections 150, 152, and 154. Sections 150,152, and 154 may be attached together to form drill template 100 so that vacuum housing 102 may have dimensions, for example, within a range of 30 inches to 45 inches. Sections 150 and 152, or sections 152 and 154, may be held together via fastener arms 146, which may be molded as an integral part of the structure of sections 150, 152, and 154. Fasteners 148, which may be nut and bolt fasteners, for example, may be inserted in fastener arms 146 and used to hold sections 150 and 152, and sections 152 and 154, together.

Figure 7A:
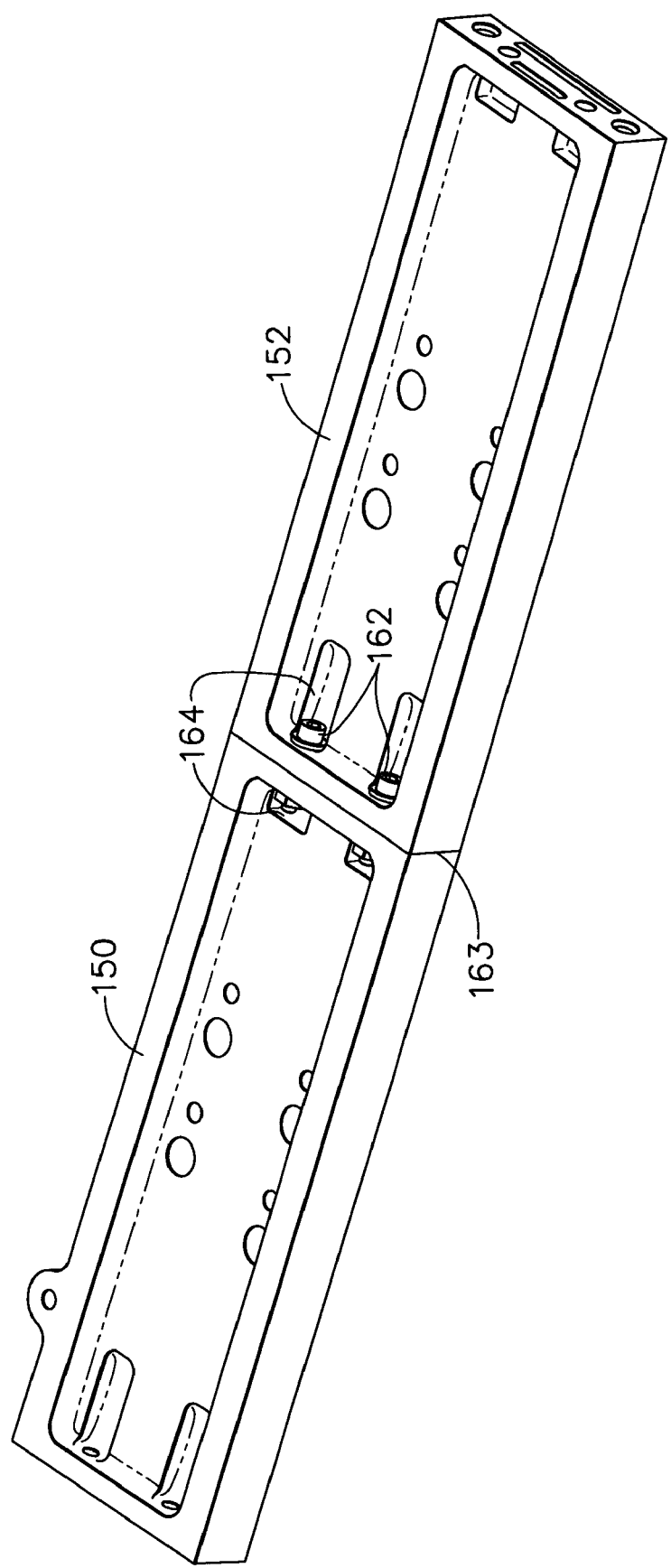
FIG. 7A is a perspective view of two joined sections of a drill template in accordance with an embodiment of the present invention.

FIGS. 7A through 7D show details of alternative methods of joining and holding multiple sections of drill template 100 together. FIG. 7A shows, for example, sections 150 and 152 joined together using nut, bolt, and washer type fasteners 162 at a joint 163. Fasteners 162 may include, for example, a 10–32×1.0 inch long socket head capscrew, a #10 steel flat washer, and 10–32 hexnut. Fasteners 162 may be accommodated by recesses 164, as shown in FIG. 7A. Recesses 164 may be formed, for example, during a selective laser sintering process used to fabricate the sections—such as sections 150 and 152—used to fabricate template 100.

Figure 7B:
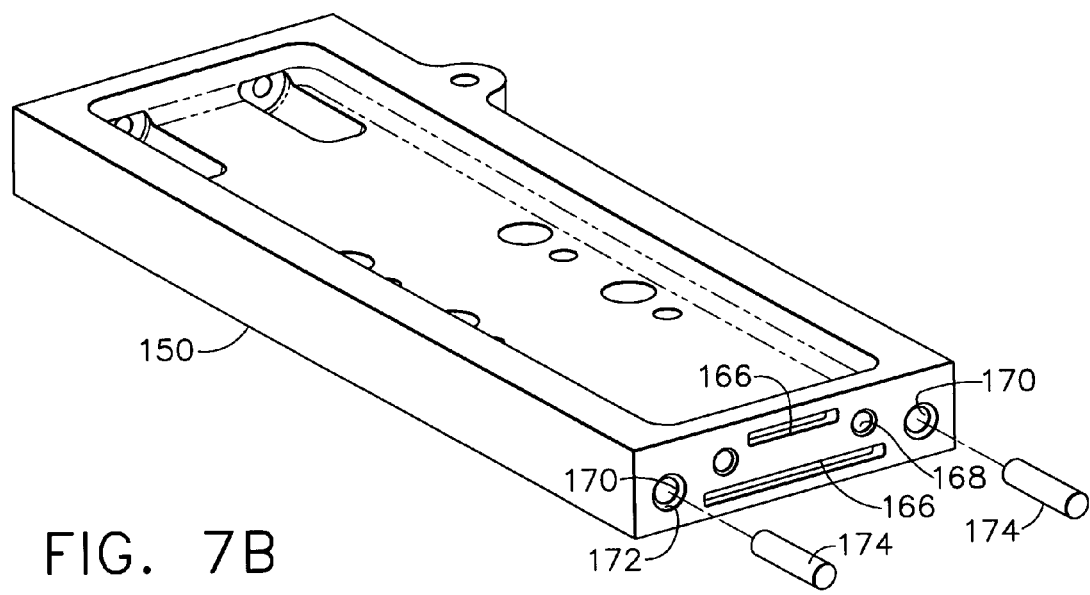
FIG. 7B is a perspective view of a section of a drill template, showing joinery details, in accordance with an embodiment of the present invention.
Figure 7C:
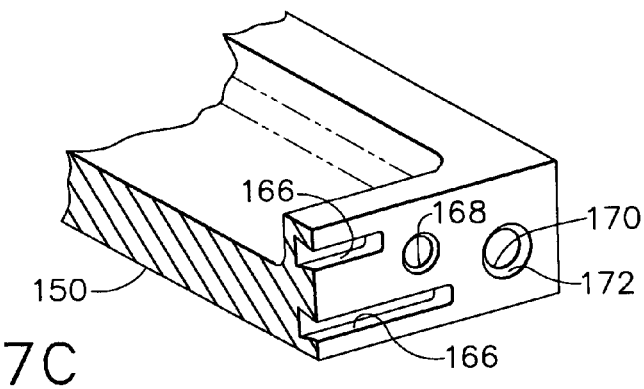
FIG. 7C is a detail perspective view of a cut away portion of the section of a drill template shown in FIG. 7B.
Figure 7D:
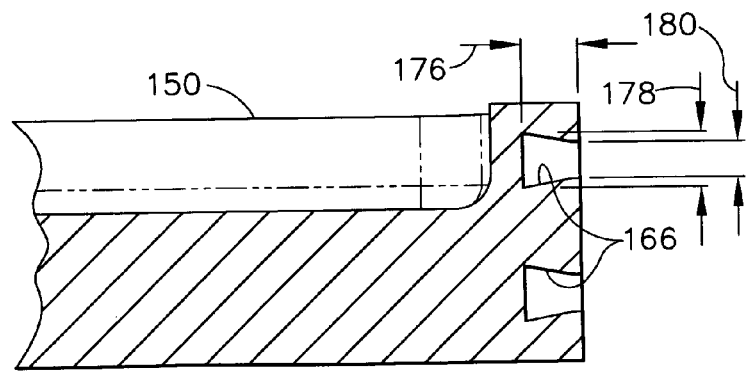
FIG. 7D is a side view of the cut away portion of the section of a drill template shown in FIG. 7C.

FIG. 7B shows another alternative example method of joining sections of template 100. Each section—such as section 150 shown in FIG. 7B—may include one or more dovetail grooves 166. Each section 150 may also include a hole or holes 168. Each section 150 may also include a hole or holes 170. Each hole 170 may include a countersink 172. Holes 168 and 170, countersink 172, and dovetail grooves 166 are shown in more detail in FIG. 7C. Hole 170 may be sized to receive a dowel pin 174 with a press fit, which may align, strengthen, and stabilize the joint 163. For example, dowel pin 174 may be a stainless steel dowel pin 1.0 inch long with 0.25 inch diameter. Hole 170 may be formed 0.53 inch deep (each hole needs only be deep enough to receive one half of dowel pin 174) with a 0.24 inch diameter, and may be hand reamed to 0.25 inch diameter to form a press fit with dowel pin 174. Countersink 172 may be, for example, a 0.05 inch×45° countersink.

Sections 150 and 152, for example, may be joined to each other using an adhesive, such as epoxy. Adhesive may be applied to both surfaces of the joint 163 and may be used to fill holes 168 for extra strength. Holes 168, for example, may have a 0.20 inch diameter and may line up with each other across joint 163. Adhesive may also be used to fill countersinks 172 to further strengthen the joint 163 and stabilize dowel pins 174. Adhesive may also be used to fill dovetail grooves 166, which may also line up with each other across joint 163. The dovetail grooves 166, being filled with a hardened adhesive, such as epoxy, may provide a geometrical "bowtie" shape in cross section, which may further act to lock the sections—such as sections 150 and 152—together across joint 163. The cross section shape of dovetail grooves 166 is shown in greater detail in FIG. 7D. Each dovetail groove 166 may have, for example, a depth 176 of 0.20 inch, a bottom width 178 of 0.20 inch, and an opening width 180 of 0.13 inch.

Figure 4:
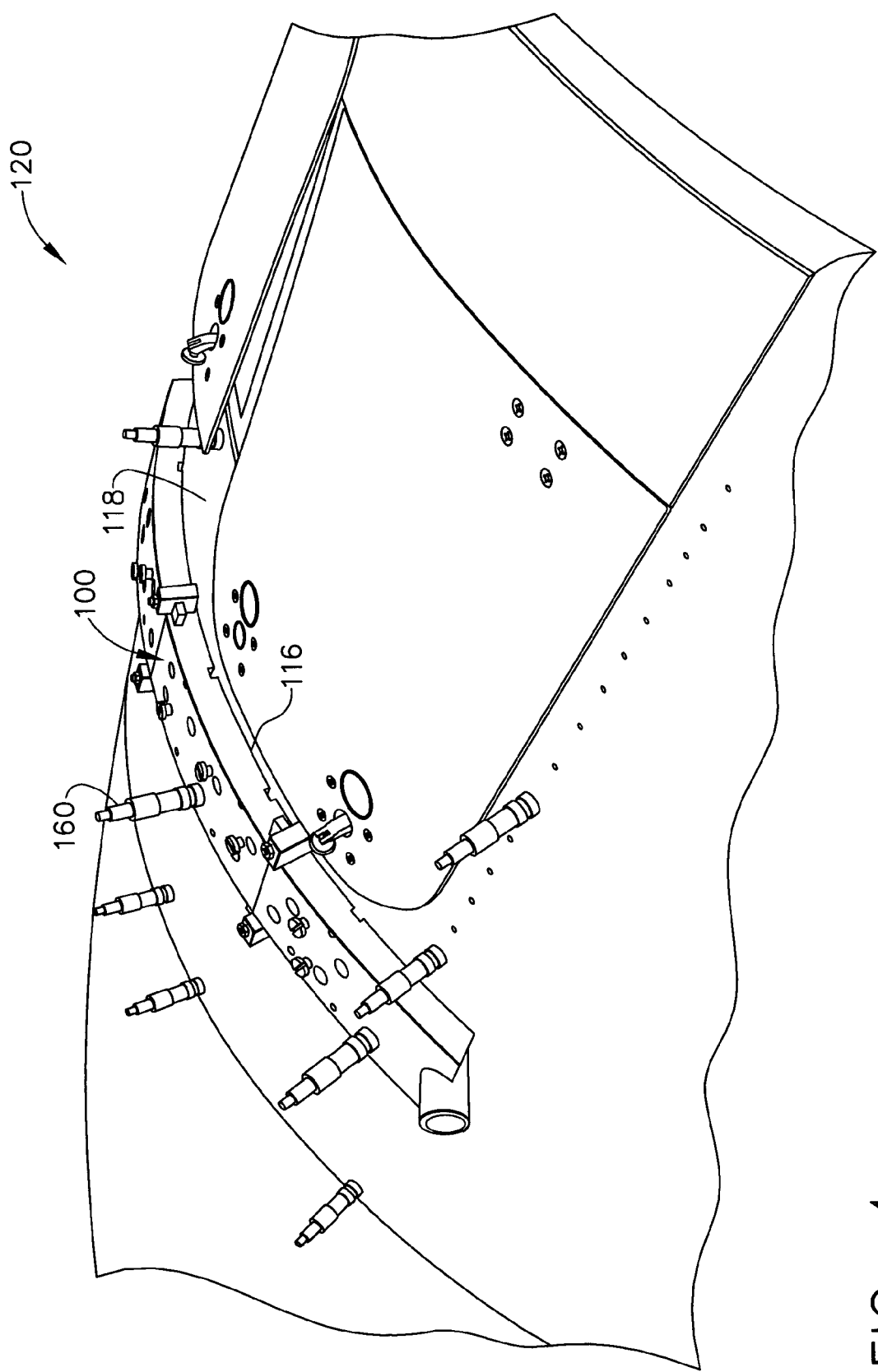
FIG. 4 is an oblique view of a drill template positioned on a surface of a structure in accordance with an embodiment of the present invention.
Figure 5:
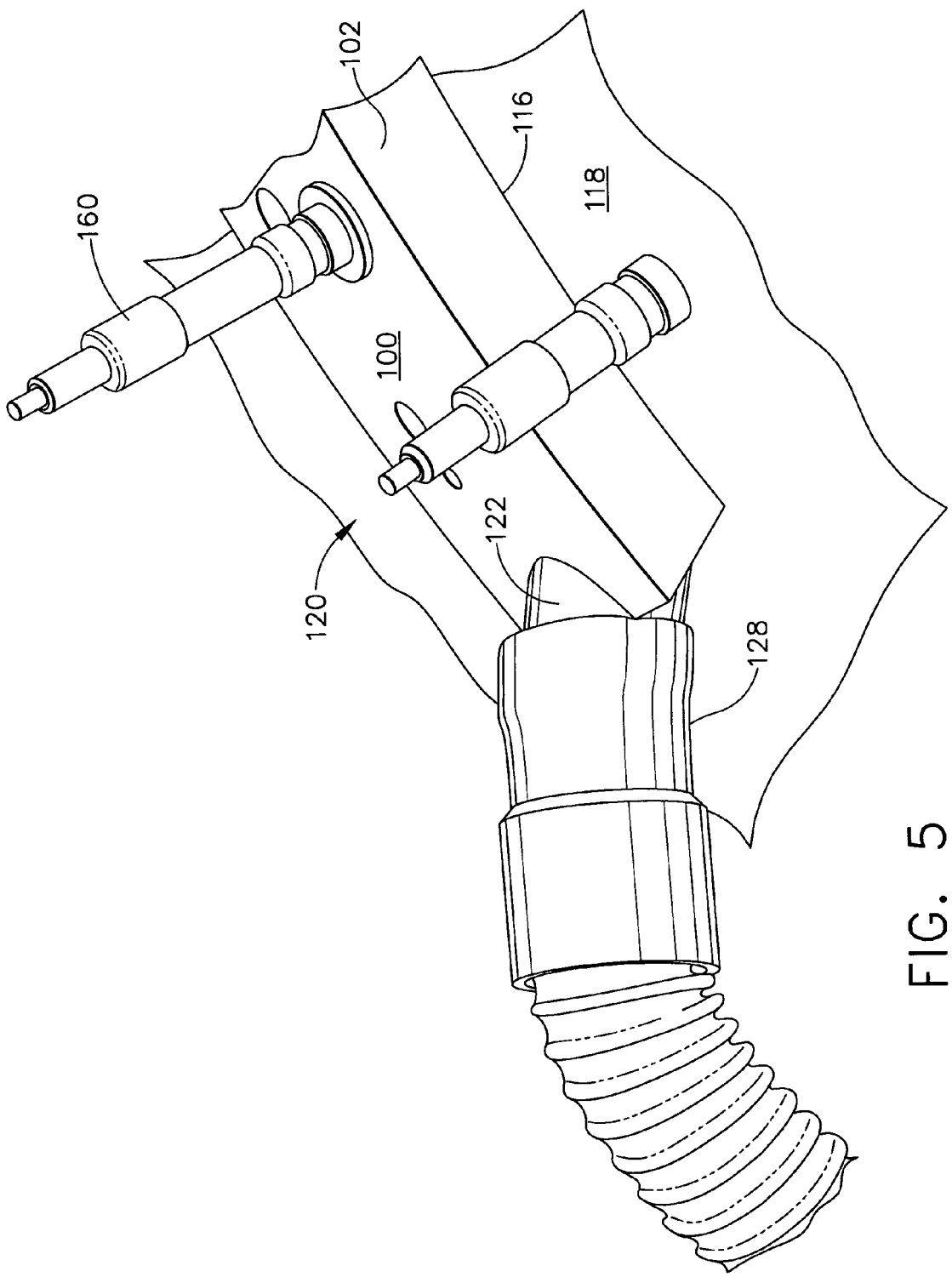
FIG. 5 is a close-up view of a vacuum hose attached to the drill template illustrated in FIG. 4.
Figure 6:
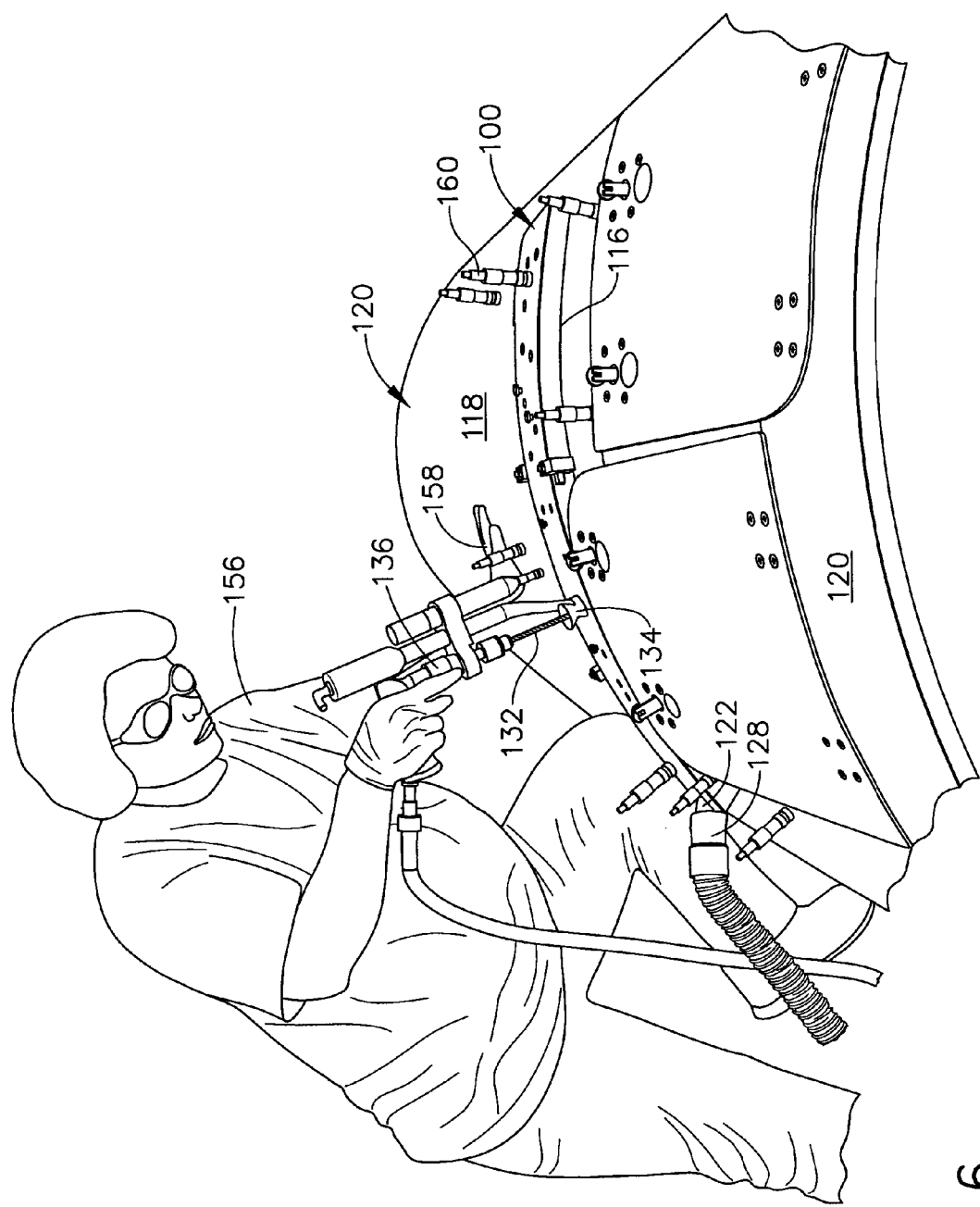
FIG. 6 is a perspective view showing a drill template, drill, and operator, in accordance with an embodiment of the present invention.

Drill template 100 may allow the formation of a predefined pattern of holes on a structure—such as structure 120, shown in FIGS. 4 through 6—where an operator—such as operator 156, shown in FIG. 6—may manually perform the drilling process while drilling debris is automatically removed and collected by a vacuum system attached to template 100 at vacuum port 122 via hose fitting 128. As shown in FIG. 6, during the drilling process, an operator 156 may experience very little ergonomic stress and may have a free hand 158 to support herself.

Drill template 100 may be used to form a pattern of holes in a structure—such as structure 120, which may comprise an outer skin over a substructure built according to a CAD solid model. Drill template 100 may be located to the substructure using the CAD-formed edge of part locators 142 formed on vacuum housing 102 of drill template 100 according to the same CAD solid model according to which structure 120 is built. Index holes may be drilled into the substructure using index holes 138 of template 100. The template 100 may be removed from the substructure, the skin may be loaded onto the substructure, and the index holes may be backdrilled through the skin. The drill template 100 may then be positioned on the skin of structure 120 using the CAD-formed edge of part locators 142 and CAD-formed contact surfaces 116 so that the CAD-formed contact surfaces 116 achieve an exact fit, as described above, with the CAD-built outside mold line surface 118 of structure 120. Drill template 100 may be secured to structure 120, for example, using pin clamps 160, shown in FIGS. 4 through 6, inserted, for example, in index holes in drill template 100 and structure 120. A vacuum system may be connected to template 100 at vacuum port 122 via hose fitting 128, as shown in FIGS. 5 and 6. A drill tool may be secured to the template 100 using a drill support attachment 134, as shown in FIG. 6. A vacuum may then be supplied to vacuum housing 102 and holes may be drilled into structure 120 using drill bushings 130 as guides to positioning the holes so that a pattern of holes is formed in structure 120 according to the pattern provided by template 100. The vacuum system may remove drilling debris and dust through vacuum port 122 and collect the drilling debris and dust.

It should be understood, of course, that the foregoing relates to preferred embodiments of the invention and that modifications may be made without departing from the spirit and scope of the invention as set forth in the following claims.

We claim:

1. A drill template for a structure having a mold line surface fabricated according to a precise definition using computer aided design (CAD), comprising:
    a vacuum housing having a CAD-formed contact surface integral with and formed of the same material as said vacuum housing, wherein said vacuum housing and contact surface are built directly from said precise definition for the mold line surface of the structure using one of selective laser sintering, fused deposition modeling, or stereo-lithography so that said vacuum housing contact surface has the form of an exact fit to the mold line surface of the structure at said CAD-formed contact surface whether or not in contact with the structure; and
    at least one drill bushing extending through said vacuum housing from a top surface to an interior surface of said vacuum housing.

2. The drill template as claimed in claim 1 wherein said vacuum housing includes a vacuum port adapted to be connected to a vacuum system.

3. The drill template as claimed in claim 1 wherein said vacuum housing includes a CAD-formed edge of part locator.

4. The drill template of claim 1 wherein said CAD-formed contact surface of said vacuum housing conforms to a CAD engineering solid model of the outside mold line surface of a structure.

5. The drill template of claim 1 wherein said vacuum housing is formed of a laser sintered material using a CAD solid model to achieve an exact fit to a surface of a structure.

6. The drill template of claim 1 wherein said vacuum housing includes at least one index hole extending from said top surface to said contact surface of said vacuum housing.

7. A drill template for drilling holes into a structure with an exterior surface formed using a computer aided design (CAD) engineering solid model, the exterior surface precisely specified by a CAD geometry of the engineering solid model, said drill template comprising:
    a vacuum housing having a CAD-formed contact surface, said vacuum housing being formed by selective laser sintering, wherein said contact surface is formed integrally as part of said vacuum housing and of the same material by selective laser sintering according to the precisely specified CAD geometry used to form the exterior surface so that said integral contact surface has the form of an exact fit to the exterior surface;

at least one drill guide bushing extending through said vacuum housing from a top surface to an interior surface of said vacuum housing; and at least one vacuum port integral to said vacuum housing wherein said vacuum housing and said vacuum port are formed integrally of the same material by selective laser sintering.

8. The drill template of claim 7 wherein said vacuum housing includes at least one drill support attachment positioned near said at least one drill guide bushing, said at least one drill support attachment adapted to secure a drill to said drill template.

9. The drill template of claim 7 further including a skirt having said CAD-formed contact surface, said skirt enclosing an interior space to form a vacuum chamber.

10. The drill template of claim 9 wherein said vacuum port communicates with said vacuum chamber.

11. The drill template of claim 7 wherein said CAD-formed contact surface of said vacuum housing conforms to an exact fit with a mold line surface of said structure.

12. A debris collecting vacuum drill template for forming holes in a structure, said drill template comprising:

a vacuum housing having a CAD-formed contact surface;

at least one recess accommodating a fastener that holds sections of said vacuum housing together;

at least one drill bushing extending through said vacuum housing from a top surface to an interior surface of said vacuum housing;

at least one drill support attachment positioned near said at least one drill bushing, said at least one drill support attachment adapted to secure a drill to said drill template; and an integral vacuum port that provides vacuum communication from an opening to said interior surface.

13. The drill template of claim 12 further including at least one fastener arm with a fastener that holds sections of said vacuum housing together.

14. The drill template of claim 12 further including at least one dovetail groove, said dovetail groove filled with a hardened adhesive that holds sections of said vacuum housing together.

15. A drilling system for an aircraft fuselage structure having an outside mold line surface formed according to a computer aided design (CAD) engineering solid model, and having the outside mold line surface specified using CAD electronic data files of the CAD engineering solid model, said system comprising:

a drill template which includes:

a vacuum housing with a skirt having a CAD-formed contact surface, wherein said skirt, including said contact surface of said skirt, and said vacuum housing are integrally fabricated by being generated directly using said CAD electronic data files of the CAD engineering solid model to conform to the CAD engineering solid model of the outside mold line surface of the aircraft fuselage structure so that said CAD-formed contact surface has the form of an exact fit with the outside mold line surface of said aircraft fuselage structure prior to contacting the outside mold line surface of the aircraft fuselage structure;

at least one drill guide bushing extending through said vacuum housing from a top surface to an interior surface of said vacuum housing;

at least one vacuum port integral to said vacuum housing, wherein said vacuum housing and said vacuum port are integrally fabricated along with said skirt;

at least one index hole for positioning and aligning said vacuum housing on said aircraft fuselage structure, said index hole extending from said top surface to said CAD-formed contact surface of said vacuum housing;

a CAD-formed edge of part locator formed according to a CAD solid model of said aircraft fuselage structure and fitting to a precise location of said aircraft fuselage structure; and wherein said vacuum port that provides vacuum communication from an external opening to said interior surface.

16. The drill template of claim 12 further including at least one hole accommodating with a press fit a dowel pin that aligns and holds sections of said vacuum housing together.

17. The drill template of claim 12 wherein said vacuum housing includes at least one index hole for positioning and aligning said vacuum housing on said structure.

18. The drill template of claim 12 wherein said vacuum housing includes a CAD-formed edge of part locator formed according to a CAD solid model of said structure.

19. The drill template of claim 12 wherein said vacuum housing is formed from nylon by selective laser sintering.

* * * * *